(12) United States Patent
Huang et al.

(10) Patent No.: US 9,141,231 B2
(45) Date of Patent: Sep. 22, 2015

(54) OPTICAL TOUCH DEVICE AND FRAME THEREOF

(75) Inventors: Po-Liang Huang, New Taipei (TW); Shih-Che Chien, New Taipei (TW)

(73) Assignee: Wistron Corporation, New Taipei (TW)

( * ) Notice: Subject to any disclaimer, the term of this patent is extended or adjusted under 35 U.S.C. 154(b) by 195 days.

(21) Appl. No.: 13/459,247

(22) Filed: Apr. 29, 2012

(65) Prior Publication Data

US 2013/0141390 A1    Jun. 6, 2013

(30) Foreign Application Priority Data

Dec. 5, 2011 (TW) .............................. 100144730 A

(51) Int. Cl.
    *G09G 3/00*      (2006.01)
    *G06F 3/042*      (2006.01)

(52) U.S. Cl.
    CPC .................................. *G06F 3/0421* (2013.01)

(58) Field of Classification Search
    CPC .................................................. G06F 3/0421
    USPC ............ 345/173, 175, 178; 178/18.09, 18.11, 178/18.2; 362/606
    See application file for complete search history.

(56) References Cited

U.S. PATENT DOCUMENTS

| | | | | |
|---|---|---|---|---|
| 2009/0316430 | A1* | 12/2009 | Chuang et al. | 362/606 |
| 2011/0037733 | A1* | 2/2011 | Yi | 345/175 |
| 2011/0102375 | A1* | 5/2011 | Liu et al. | 345/175 |
| 2011/0241977 | A1* | 10/2011 | Powell | 345/32 |
| 2012/0097854 | A1 | 4/2012 | Ng | |
| 2012/0249478 | A1* | 10/2012 | Chang et al. | 345/175 |
| 2013/0141392 | A1* | 6/2013 | Cheng et al. | 345/175 |

FOREIGN PATENT DOCUMENTS

| | | |
|---|---|---|
| CN | 1860431 A | 11/2006 |
| TW | 201043997 | 12/2010 |
| TW | 201101153 | 1/2011 |
| TW | 201118689 | 6/2011 |
| TW | M410285 | 8/2011 |

OTHER PUBLICATIONS

Office action mailed on Feb. 12, 2014 for the Taiwan application No. 100144730, filing date: Dec. 5, 2011, p. 1 line 11-14, p. 2-4 and p. 5 line 1-7 and line 11-13.

(Continued)

*Primary Examiner* — Kent Chang
*Assistant Examiner* — Nelson Rosario
(74) *Attorney, Agent, or Firm* — Winston Hsu; Scott Margo

(57) ABSTRACT

An optical touch device includes an indication plane, an image sensing unit, a light emitting unit and a frame. A sensing region is defined on the indication plane. The image sensing unit is disposed at a corner of the indication plane. The light emitting unit is disposed beside the image sensing unit and used for emitting light to the sensing region. The frame is disposed at one side of the indication plane. The frame includes two first inclined surfaces connected to each other and facing the sensing region.

20 Claims, 9 Drawing Sheets

(56) References Cited

OTHER PUBLICATIONS

Office action mailed on May 22, 2014 for the Taiwan application No. 100144730, filing date: Dec. 5, 2011, p. 1 line 12-14, p. 2-5 and p. 6 line 1-16 and line 20-22.

Office action mailed on Apr. 28, 2015 for the China application No. 201110440579.X, p. 3 line 4-31, p. 4-10 and p. 11 line 1-8 Translation.

* cited by examiner

OPTICAL TOUCH DEVICE AND FRAME THEREOF

BACKGROUND OF THE INVENTION

1. Field of the Invention

The invention relates to an optical touch device and a frame thereof and, more particularly, to a frame, which is adapted for an optical touch device, capable of eliminating background noise well.

2. Description of the Prior Art

Since consumer electronic products have become more and more lighter, thinner, shorter, and smaller, there is no space on these products for containing a conventional input device, such as mouse, keyboard, etc. With development of touch technology, in various kinds of consumer electronic products (e.g. display device, all-in-one device, mobile phone, personal digital assistant (PDA), etc.), a touch device has become a main tool for data input. Compared with other touch design, such as a resistive touch design, a capacitive touch design, an ultrasonic touch design, or a projective touch design, an optical touch design has lower cost and is easier to use.

A conventional optical touch device utilizes light emitting units to emit light onto a touch object (e.g. finger or stylus) such that the touch object reflects light to an image sensing unit. Afterward, the image sensing unit will generate an image after receiving the reflected light. One of the key factors in image processing algorithm is whether the reflected light signal from the touch object can be distinguished from the background noise well. That is to say, if the reflected light signal from the touch object can be distinguished from the background noise well, the image processing algorithm can be processed and controlled well accordingly, otherwise the image processing algorithm may become complicated and has to be calculated by more powerful processor.

In general, the strength of background noise is usually determined according to a frame of the conventional optical touch device. Referring to FIGS. 1 and 2, FIG. 1 is a schematic diagram illustrating a frame 1 of the prior art, and FIG. 2 is a distribution diagram illustrating a signal-to-noise ratio measured by using the frame 1 shown in FIG. 1. As shown in FIG. 1, the frame 1 is formed as a triangular column. As shown in FIG. 2, the background noise is huge and disordered within the signal-to-noise ratio measured by using the frame 1. In other words, the frame 1 cannot eliminate the background noise.

SUMMARY OF THE INVENTION

The invention provides a frame, which is adapted for an optical touch device, capable of eliminating background noise well so as to solve the aforesaid problems.

According to an embodiment of the invention, an optical touch device comprises an indication plane, an image sensing unit, a light emitting unit and a frame. A sensing region is defined on the indication plane. The image sensing unit is disposed at a corner of the indication plane. The light emitting unit is disposed beside the image sensing unit and used for emitting light to the sensing region. The frame is disposed at one side of the indication plane. The frame comprises two first inclined surfaces, wherein the two first inclined surfaces are connected to each other and face the sensing region.

According to another embodiment of the invention, a frame adapted for an optical touch device comprises two first inclined surfaces and the two first inclined surfaces are connected to each other.

According to another embodiment of the invention, an optical touch device comprises an indication plane, an image sensing unit, a light emitting unit and a frame. A sensing region is defined on the indication plane. The image sensing unit is disposed at a corner of the indication plane. The light emitting unit is disposed beside the image sensing unit and used for emitting light to the sensing region. The frame is disposed at one side of the indication plane. The frame comprises a plurality of curved surfaces, wherein the curved surfaces are arranged in equal pitch and face the sensing region.

According to another embodiment of the invention, a frame adapted for an optical touch device comprises a plurality of curved surfaces, wherein the curved surfaces are arranged in equal pitch.

As mentioned in the above, the invention forms at least two inclined surfaces connected to each other or forms a plurality of curved surfaces arranged in equal pitch on one side of the frame, which faces the sensing region. In other words, the invention utilizes compound inclined surfaces or compound curved surfaces to scatter and reflect light so as to reflect and deflect the light from the image sensing unit. Since background noise is formed by the reflected light mainly, the background noise can be eliminated well by reflecting and deflecting the light.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
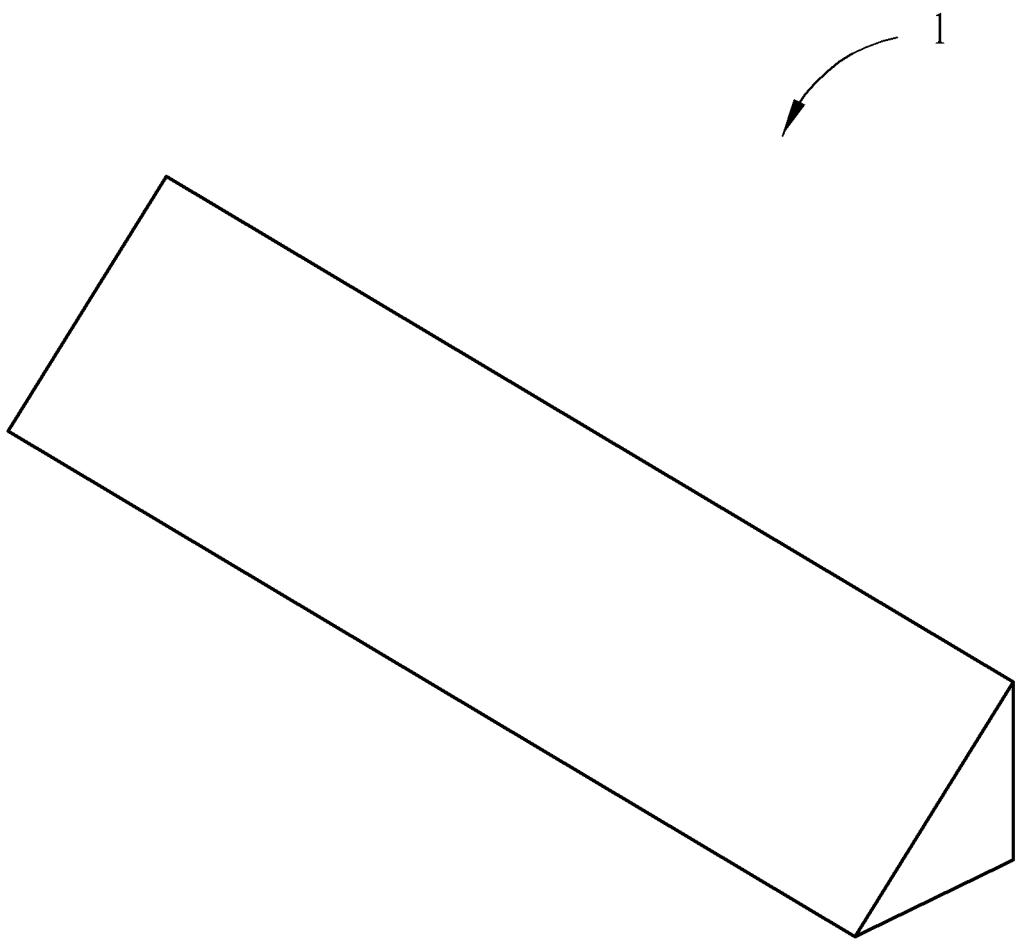
FIG. 1 is a schematic diagram illustrating a frame of the prior art.
Figure 2:
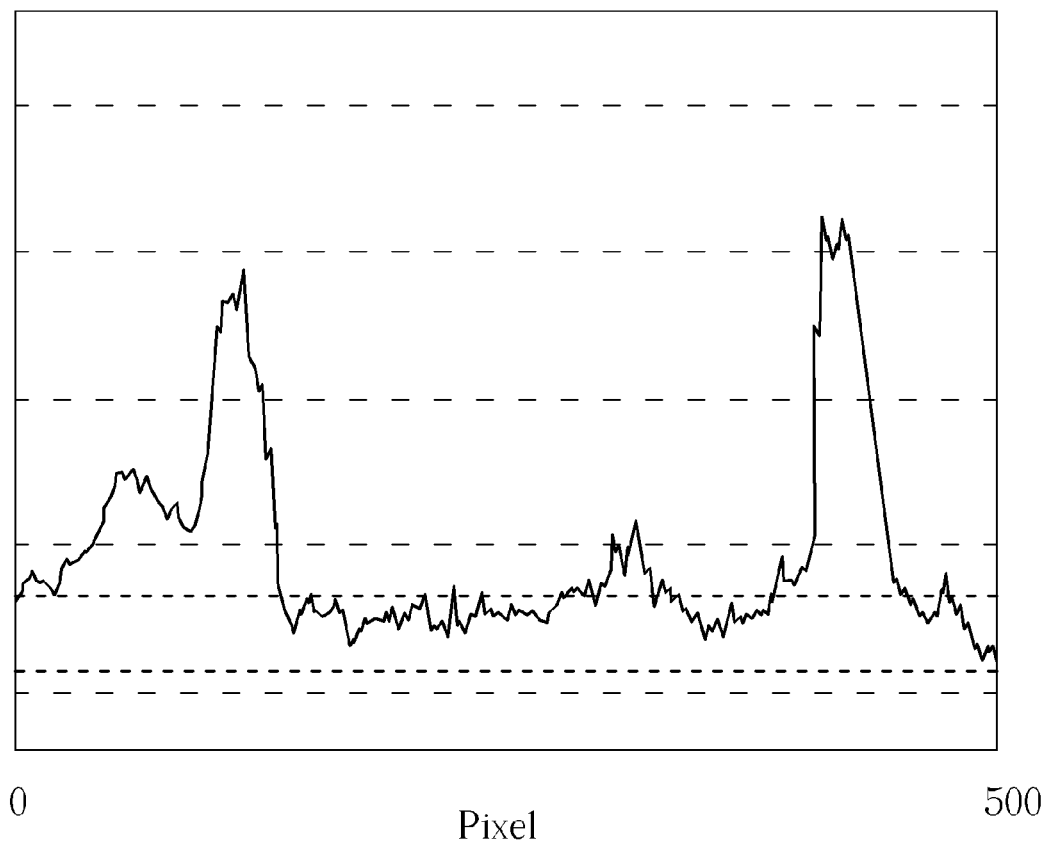
FIG. 2 is a distribution diagram illustrating a signal-to-noise ratio measured by using the frame shown in FIG. 1.
Figure 3:
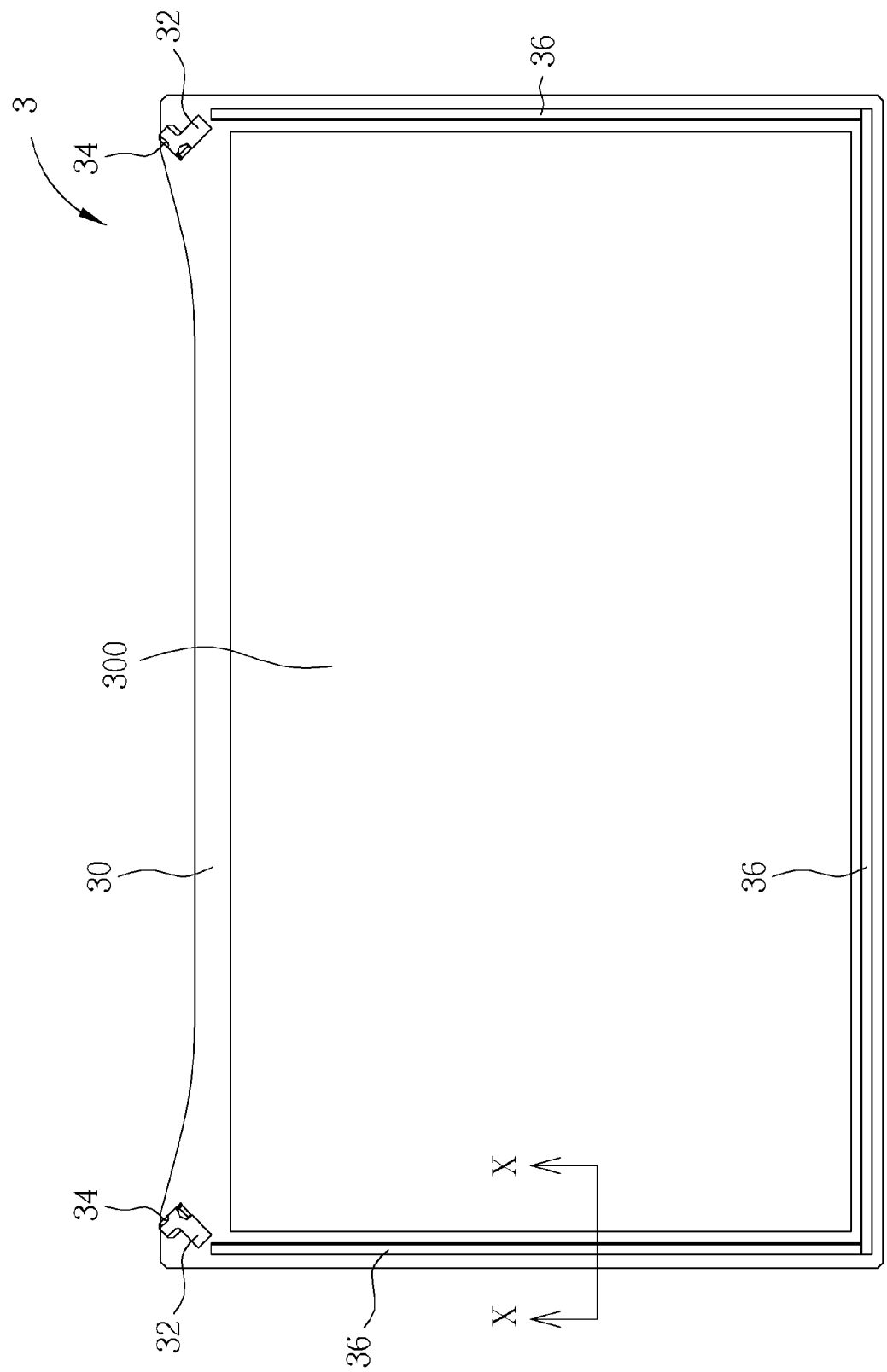
FIG. 3 is a schematic diagram illustrating an optical touch device according to an embodiment of the invention.
Figure 4:
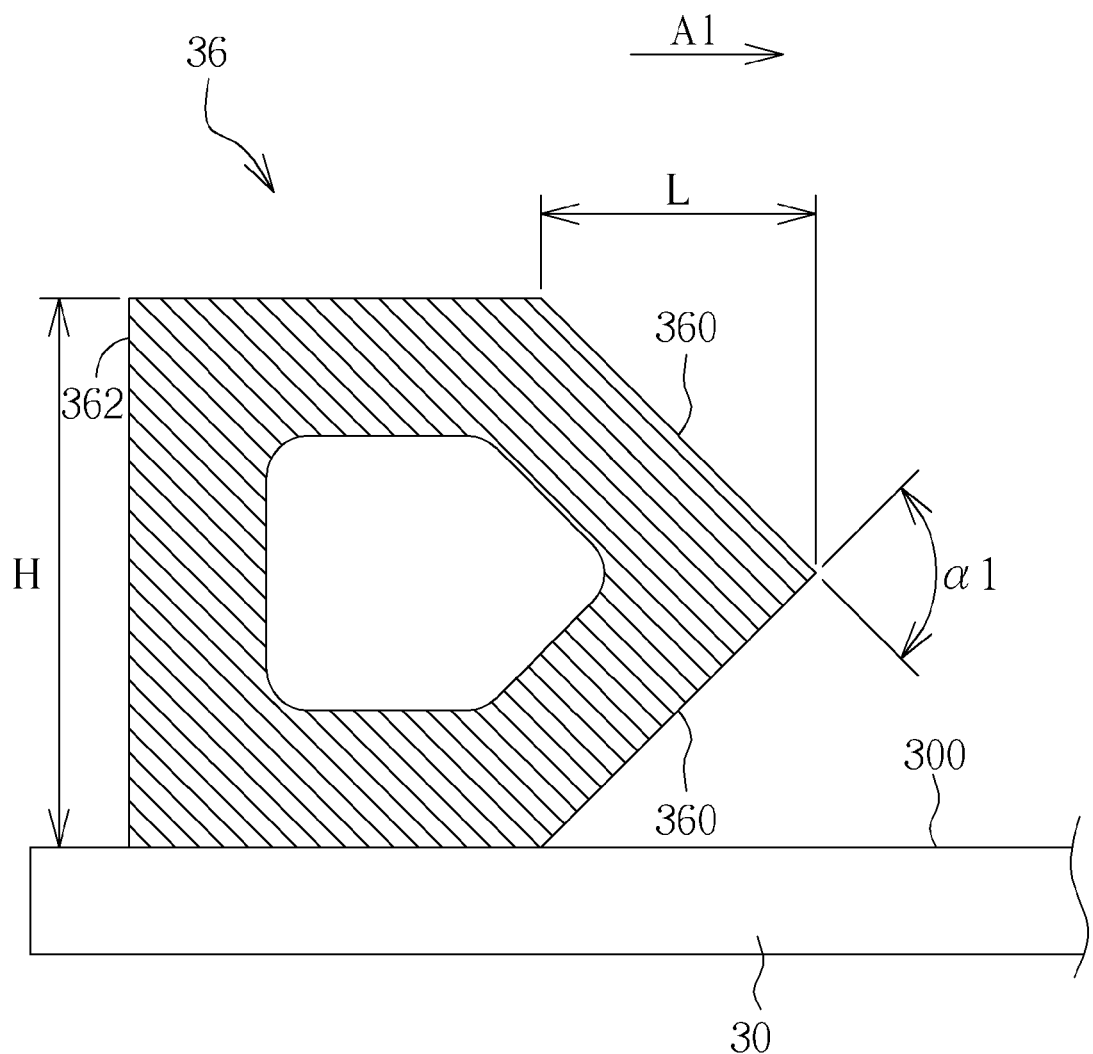
FIG. 4 is a partial cross-sectional view illustrating the optical touch device along X-X line shown in FIG. 3.
Figure 5:
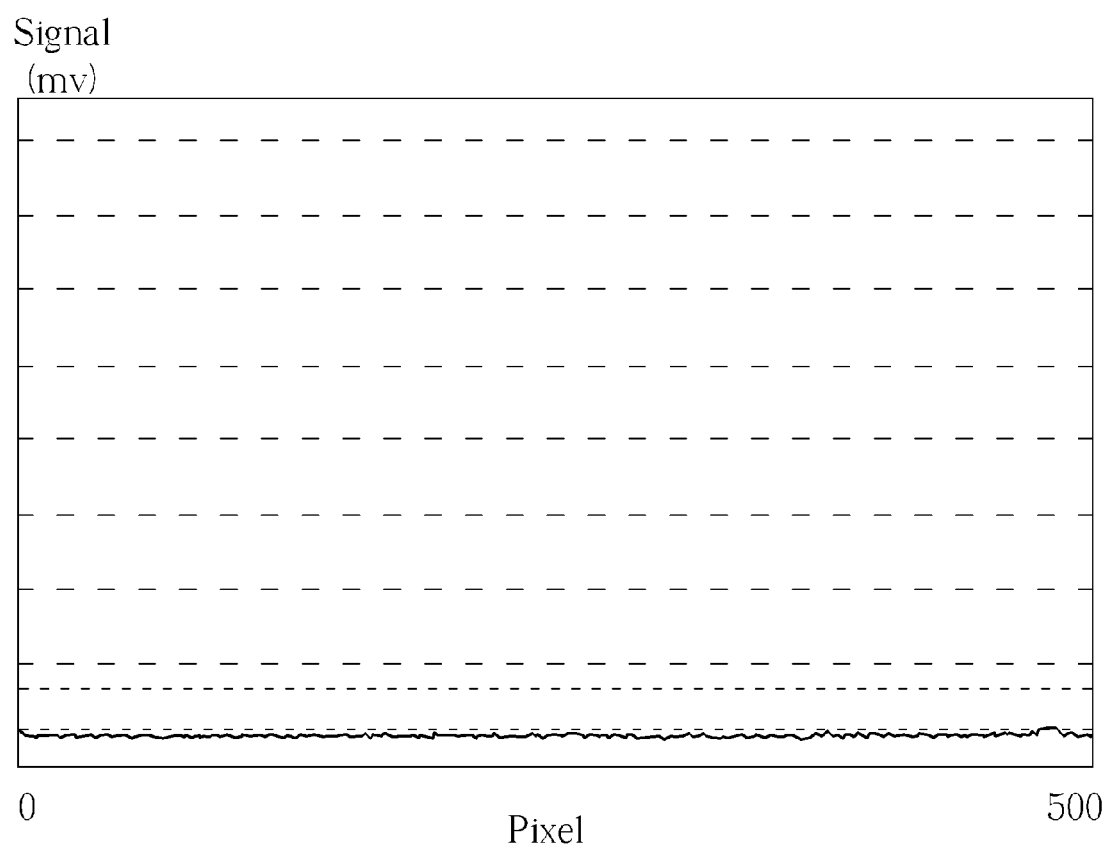
FIG. 5 is a distribution diagram illustrating a signal-to-noise ratio measured by using the frame shown in FIG. 4.

Referring to FIGS. 3 to 5, FIG. 3 is a schematic diagram illustrating an optical touch device 3 according to an embodiment of the invention, FIG. 4 is a partial cross-sectional view illustrating the optical touch device 3 along X-X line shown in FIG. 3, and FIG. 5 is a distribution diagram illustrating a signal-to-noise ratio measured by using the frame 36 shown in FIG. 4. As shown in FIG. 3, the optical touch device 3 comprises an indication plane 30, two image sensing units 32, two light emitting units 34 and three frames 36. A sensing region 300 is defined on the indication plane 30. The two image sensing units 32 are disposed at opposite corners of the indication plane 30. The two light emitting units 34 are disposed beside the two image sensing units 32 respectively and used for emitting light to the sensing region 300. The three frames 36 are disposed at three sides of the indication plane 30 respectively and used for deflecting reflected light from the image sensing units 32 so as to eliminate background noise.

In practical applications, the image sensing unit 32 may be, but not limited to, charge-coupled device (CCD) sensor or complementary metal-oxide semiconductor (CMOS) sensor, the light emitting unit 34 may be, but not limited to, light emitting diode, and the frame 36 may be formed by, but not limited to, plastic material through a drawing process or an injection molding process.

In general, the optical touch device 3 may be equipped with some necessary hardware or software components for specific purposes, such as a display panel, a central processing unit (CPU), a memory, a storage device, a power supply, an operating system, etc., and it depends on practical applications. Functions of the aforesaid components are known for those skilled in the art, so it will not be depicted herein.

As shown in FIG. 4, each of the frames 36 comprises two first inclined surfaces 360, wherein the two first inclined surfaces 360 are connected to each other and face the sensing region 300 of the indication plane 30. Furthermore, a first angle α1 is included between the two first inclined surfaces 360 and the first angle α1 is between 75 degrees and 120 degrees. In this embodiment, the two first inclined surfaces 360 protrude away from a back surface 362 of the frame 36 (toward a direction indicated by an arrow A1). A height H of the back surface 362 is between 2.5 mm and 15 mm and a vertical length L of the two first inclined surfaces 360 is between 0.2 H and 0.75 H. In this embodiment, the frame 36 may be formed as a hollow strip-shaped structure (as shown in FIG. 4) through a drawing process so as to save material for the frame 36. Accordingly, manufacture cost can be reduced. When the light emitting unit 34 emits light onto the two first inclined surfaces 360, the two first inclined surfaces 360 will reflect and deflect the light from the image sensing unit 32 so as to eliminate background noise well. As shown in FIG. 5, the background noise is tiny within the signal-to-noise ratio measured by using the frame 36. In other words, the frame 36 can eliminate the background noise very well.

Figure 6:
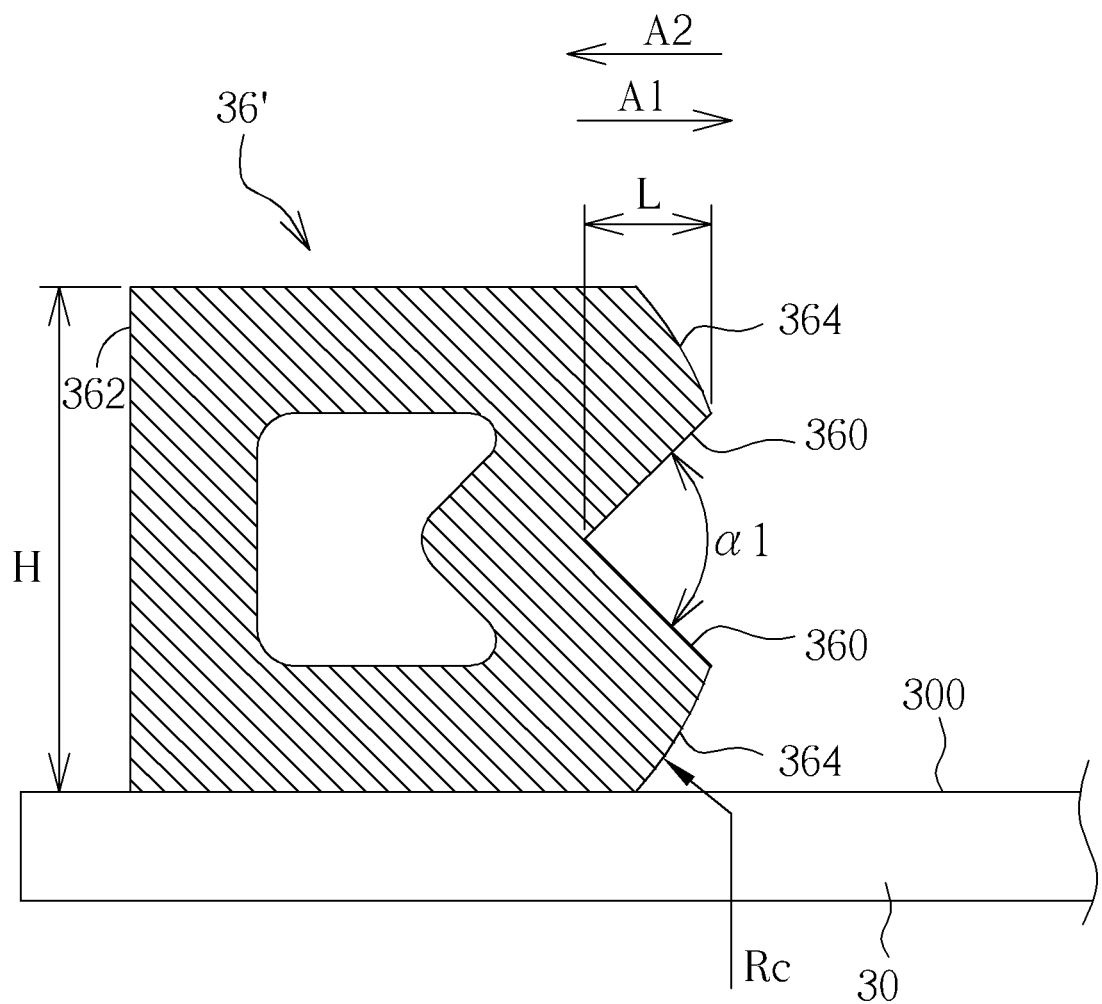
FIG. 6 is a partial cross-sectional view illustrating a frame disposed at one side of the indication plane according to another embodiment of the invention.
Figure 7:
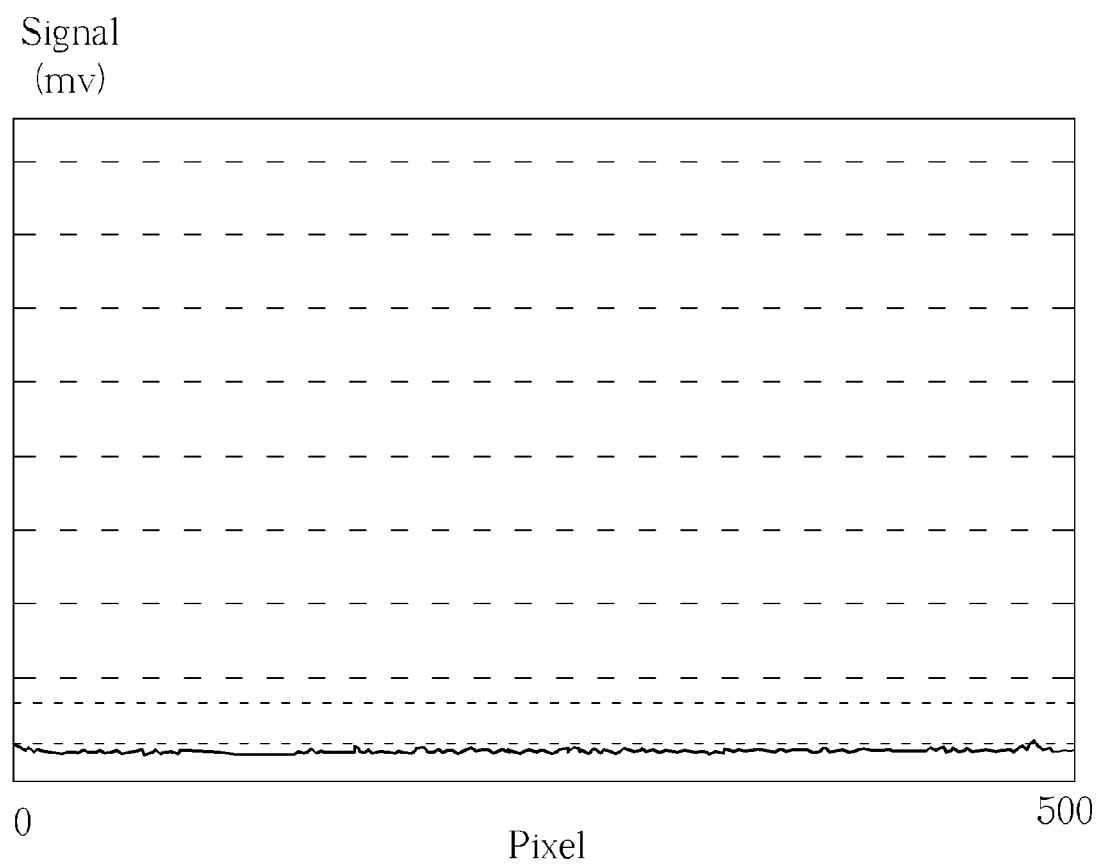
FIG. 7 is a distribution diagram illustrating a signal-to-noise ratio measured by using the frame shown in FIG. 7.

Referring to FIGS. 6 and 7, FIG. 6 is a partial cross-sectional view illustrating a frame 36' disposed at one side of the indication plane 30 according to another embodiment of the invention, and FIG. 7 is a distribution diagram illustrating a signal-to-noise ratio measured by using the frame 36' shown in FIG. 7. The frame 36 of the optical touch device 3 shown in FIG. 3 can be replaced by the frame 36' shown in FIG. 6. As shown in FIG. 6, the frame 36' comprises two first inclined surfaces 360, wherein the two first inclined surfaces 360 are connected to each other and face the sensing region 300. Furthermore, a first angle α1 is included between the two first inclined surfaces 360 and the first angle α1 is between 75 degrees and 120 degrees. In this embodiment, the two first inclined surfaces 360 sink toward aback surface 362 of the frame 36' (toward a direction indicated by an arrow A2). A height H of the back surface 362 is between 2.5 mm and 15 mm and a vertical length L of the two first inclined surfaces 360 is between 0.1 H and 0.5 H. Moreover, the frame 36' further comprises two arc surfaces 364, wherein the two arc surfaces 364 are connected to opposite sides of the two first inclined surfaces 360 and protrude away from the back surface 362 (toward a direction indicated by an arrow A1). In this embodiment, a curvature radius Rc of the two arc surfaces 364 is larger than or equal to 0.5 mm. It should be noted that when the curvature radius Rc of the arc surface 364 is approximate to infinity, the arc surface 364 is approximate to a flat surface. In this embodiment, the frame 36' may be formed as a hollow strip-shaped structure (as shown in FIG. 6) through a drawing process so as to save material for the frame 36'. Accordingly, manufacture cost can be reduced. When the light emitting unit 34 emits light onto the two first inclined surfaces 360 and the two arc surfaces 364, the two first inclined surfaces 360 and the two arc surfaces 364 will reflect and deflect the light from the image sensing unit 32 so as to eliminate background noise well. As shown in FIG. 7, the background noise is tiny within the signal-to-noise ratio measured by using the frame 36'. In other words, the frame 36' can eliminate the background noise very well.

Figure 8:
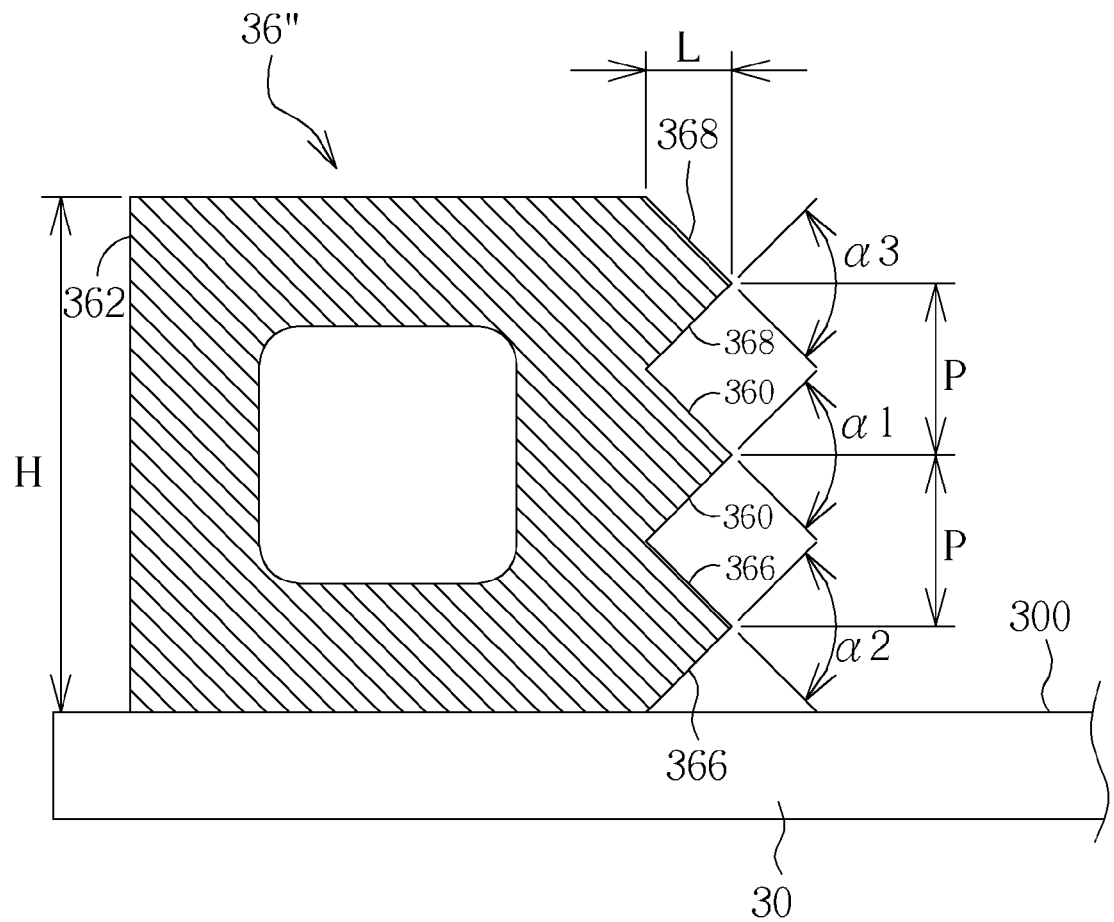
FIG. 8 is a partial cross-sectional view illustrating a frame disposed at one side of the indication plane according to another embodiment of the invention.

Referring to FIG. 8, FIG. 8 is a partial cross-sectional view illustrating a frame 36' disposed at one side of the indication plane 30 according to another embodiment of the invention. The frame 36 of the optical touch device 3 shown in FIG. 3 can be replaced by the frame 36" shown in FIG. 8. As shown in FIG. 8, the frame 36" comprises two first inclined surfaces 360, two second inclined surfaces 366 and two third inclined surfaces 368, wherein the two first inclined surfaces 360 are connected to each other, the two second inclined surfaces 366 are connected to each other and connected to one side of the two first inclined surfaces 360, and the two third inclined surfaces 368 are connected to each other and connected to another side of the two first inclined surfaces 360. The two first inclined surfaces 360, the two second inclined surfaces 366 and the two third inclined surfaces 368 face the sensing region 300 of the indication plane 30. Furthermore, a first angle α1 is included between the two first inclined surfaces 360, a second angle α2 is included between the two second inclined surfaces 366, a third angle α3 is included between the two third inclined surfaces 368, and the first angle α1, the second angle α2 and the third angle α3 are between 75 degrees and 120 degrees. In this embodiment, the two first inclined surfaces 360, the two second inclined surfaces 366 and the two third inclined surfaces 368 protrude away from a back surface 362 of the frame 36" (toward a direction indicated by an arrow A1). A height H of the back surface 362 is between 2.5 mm and 15 mm and vertical lengths L of the two first inclined surfaces 360, the two second inclined surfaces 366 and the two third inclined surfaces 368 are between 0.08 H and 0.3 H. Moreover, a pitch P between the two second inclined surfaces 366 and the two first inclined surfaces 360 is ⅓ H and a pitch P between the two third inclined surfaces 368 and the two first inclined surfaces 360 is also ⅓ H. In this embodiment, the frame 36" may be formed as a hollow strip-shaped structure (as shown in FIG. 8) through a drawing process so as to save material for the frame 36". Accordingly, manufacture cost can be reduced. When the light emitting unit 34 emits light onto the two first inclined surfaces 360, the two second inclined surfaces 366 and the two third inclined surfaces 368, the two first inclined surfaces 360, the two second inclined surfaces 366 and the two third inclined surfaces 368 will reflect and deflect the light from the image sensing unit 32 so as to eliminate background noise well.

Figure 9:
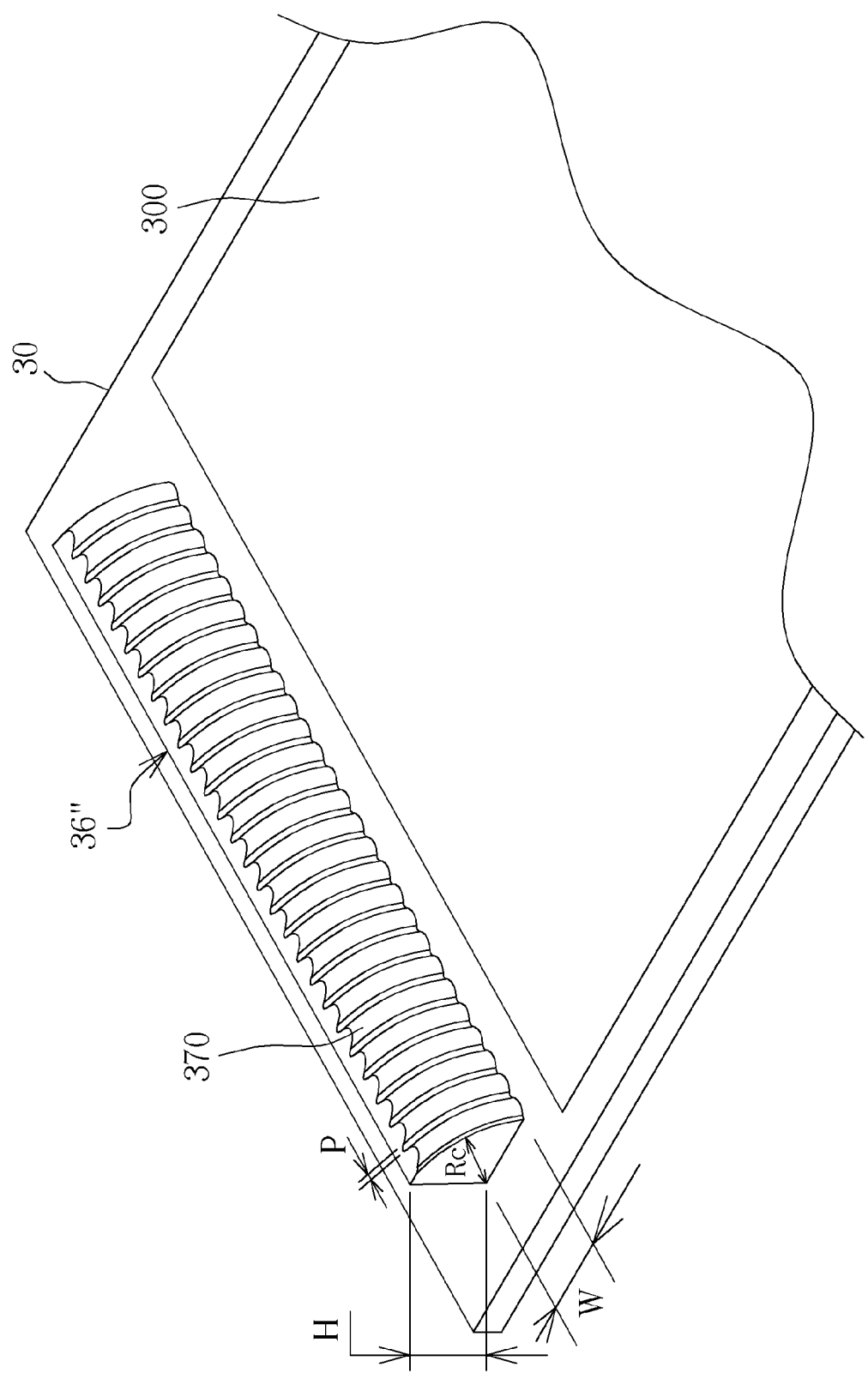
FIG. 9 is a schematic diagram illustrating a frame disposed at one side of the indication plane according to another embodiment of the invention.

Referring to FIG. 9, FIG. 9 is a schematic diagram illustrating a frame 36'" disposed at one side of the indication plane 30 according to another embodiment of the invention. The frame 36 of the optical touch device 3 shown in FIG. 3 can be replaced by the frame 36'" shown in FIG. 9. As shown in FIG. 9, the frame 36'" is disposed at one side of the indication plane 30. The frame 36'" comprises a plurality of curved surfaces 370, wherein the curved surfaces 370 are arranged in equal pitch and face the sensing region 300 of the indication plane 30. A pitch P of the curved surfaces 370 is between 0.8 mm and 2 mm and a curvature radius Rc of the curved surfaces 370 is between 3 mm and 20 mm. Furthermore, a height H of the frame 36''' is between 2.5 mm and 15 mm and a width W of the frame 36''' is between 0.8 H and 1.2 H. In this embodiment, the frame 36''' may be formed through an injection molding process. When the light emitting unit 34 emits light onto the curved surfaces 370, the curved surfaces 370 will reflect and deflect the light from the image sensing unit 32 so as to eliminate background noise well.

Compared with the prior art, the invention forms at least two inclined surfaces connected to each other or forms a plurality of curved surfaces arranged in equal pitch on one side of the frame, which faces the sensing region. In other words, the invention utilizes compound inclined surfaces or compound curved surfaces to scatter and reflect light so as to reflect and deflect the light from the image sensing unit. Since background noise is formed by the reflected light mainly, the background noise can be eliminated well by reflecting and deflecting the light.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch device comprising:
    an indication plane, a sensing region being defined on the indication plane;
    an image sensing unit disposed at a corner of the indication plane;
    a light emitting unit disposed beside the image sensing unit and used for emitting light to the sensing region; and
    a frame disposed at one side of the indication plane, the frame comprising two first inclined surfaces, the two first inclined surfaces being connected to each other and facing the sensing region;
    wherein the two first inclined surfaces sink toward a back surface of the frame, the frame further comprises two curvature arc surfaces connected to opposite sides of the two first inclined surfaces and protruding away from the back surface, the two curvature arc surfaces and the two first inclined surfaces are arranged along a direction perpendicular to the indication plane.

2. The optical touch device of claim 1, wherein the two first inclined surfaces protrude away from a back surface of the frame.

3. The optical touch device of claim 2, wherein a height H of the back surface is between 2.5 mm and 15 mm and a vertical length of the two first inclined surfaces is between 0.2H and 0.75H.

4. The optical touch device of claim 2, wherein the frame further comprises two second inclined surfaces and two third inclined surfaces, the two second inclined surfaces are connected to each other and connected to one side of the two first inclined surfaces, and the two third inclined surfaces are connected to each other and connected to another side of the two first inclined surfaces.

5. The optical touch device of claim 4, wherein a first angle is included between the two first inclined surfaces, a second angle is included between the two second inclined surfaces, a third angle is included between the two third inclined surfaces, and the first angle, the second angle and the third angle are between 75 degrees and 120 degrees.

6. The optical touch device of claim 4, wherein a height H of the back surface is between 2.5 mm and 15 mm, vertical lengths of the two first inclined surfaces, the two second inclined surfaces and the two third inclined surfaces are between 0.08H and 0.3H, a pitch between the two second inclined surfaces and the two first inclined surfaces is ⅓H, and a pitch between the two third inclined surfaces and the two first inclined surfaces is also ⅓H.

7. The optical touch device of claim 1, wherein a height H of the back surface is between 2.5 mm and 15 mm, and a vertical length of the two first inclined surfaces is between 0.1H and 0.5H.

8. The optical touch device of claim 1, wherein a curvature radius of the two curvature arc surfaces is larger than or equal to 0.5 mm.

9. A frame adapted for an optical touch device, the frame comprising two first inclined surfaces and two curvature arc surfaces, the two first inclined surfaces being connected to each other, the two first inclined surfaces sinking toward a back surface of the frame, the two curvature arc surfaces being connected to opposite sides of the two first inclined surfaces and protruding away from the back surface, the optical touch device comprising an indication plane, when the frame is disposed at one side of the indication plane, the two curvature arc surfaces and the two first inclined surfaces are arranged along a direction perpendicular to the indication plane.

10. The frame of claim 9, wherein the two first inclined surfaces protrude away from a back surface of the frame.

11. The frame of claim 10, wherein a height H of the back surface is between 2.5 mm and 15 mm and a vertical length of the two first inclined surfaces is between 0.2H and 0.75H.

12. The frame of claim 10, further comprising two second inclined surfaces and two third inclined surfaces, wherein the two second inclined surfaces are connected to each other and connected to one side of the two first inclined surfaces, and the two third inclined surfaces are connected to each other and connected to another side of the two first inclined surfaces.

13. The frame of claim 12, wherein a first angle is included between the two first inclined surfaces, a second angle is included between the two second inclined surfaces, a third angle is included between the two third inclined surfaces, and the first angle, the second angle and the third angle are between 75 degrees and 120 degrees.

14. The frame of claim 12, wherein a height H of the back surface is between 2.5 mm and 15 mm, vertical lengths of the two first inclined surfaces, the two second inclined surfaces and the two third inclined surfaces are between 0.08H and 0.3H, a pitch between the two second inclined surfaces and the two first inclined surfaces is ⅓H, and a pitch between the two third inclined surfaces and the two first inclined surfaces is also ⅓H.

15. The frame of claim 9, wherein a height H of the back surface is between 2.5 mm and 15 mm, and a vertical length of the two first inclined surfaces is between 0.1H and 0.5H.

16. The frame of claim 9, wherein a curvature radius of the two curvature arc surfaces is larger than or equal to 0.5 mm.

17. An optical touch device comprising:
    an indication plane, a sensing region being defined on the indication plane;
    an image sensing unit disposed at a corner of the indication plane;
    a light emitting unit disposed beside the image sensing unit and used for emitting light to the sensing region; and
    a frame disposed at one side of the indication plane, the frame comprising a plurality of curvature arc surfaces, the curvature arc surfaces being arranged in equal pitch and facing the sensing region, an end of each of the curvature arc surfaces being connected to the indication plane.

18. The optical touch device of claim 17, wherein a pitch of the curvature arc surfaces is between 0.8 mm and 2 mm.

19. The optical touch device of claim 17, wherein a curvature radius of the curvature arc surfaces is between 3 mm and 20 mm.

20. The optical touch device of claim 17, wherein a height H of the frame is between 2.5 mm and 15 mm and a width of the frame is between 0.8H and 1.2H.

* * * * *